(12) United States Patent
Newberg et al.

(10) Patent No.: US 7,801,526 B2
(45) Date of Patent: *Sep. 21, 2010

(54) METHODS FOR INFORMING SUBSCRIBERS OF ADJACENT SITES

(75) Inventors: Donald G. Newberg, Hoffman Estates, IL (US); Robert A. Biggs, Evanston, IL (US); Matthew C. Keller, Algonquin, IL (US); Robert D. LoGalbo, Rolling Meadows, IL (US); James E. Mathis, Barrington, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 880 days.

This patent is subject to a terminal disclaimer.

(21) Appl. No.: 11/092,089

(22) Filed: Mar. 29, 2005

(65) Prior Publication Data

US 2006/0223534 A1  Oct. 5, 2006

(51) Int. Cl.
*H04W 4/00* (2009.01)
(52) U.S. Cl. .................. 455/435.1; 455/435.2
(58) Field of Classification Search ............. 455/435.1, 455/435.2, 435.3, 436, 438, 439, 440, 445, 455/446, 450, 451, 452.2, 552.1; 370/329, 370/330, 331, 352–356
See application file for complete search history.

(56) References Cited

U.S. PATENT DOCUMENTS

| | | | |
|---|---|---|---|
| 5,577,168 A | 11/1996 | Haas | |
| 6,188,904 B1 * | 2/2001 | Marsan | 455/450 |
| 6,321,083 B1 * | 11/2001 | Vaara et al. | 455/446 |
| 6,424,638 B1 * | 7/2002 | Ray et al. | 370/331 |
| 6,810,259 B1 * | 10/2004 | Zhang | 455/456.5 |
| 6,970,449 B1 * | 11/2005 | Smith et al. | 370/349 |
| 7,058,405 B2 | 6/2006 | Chandra | |
| 7,293,235 B1 * | 11/2007 | Powers et al. | 715/706 |
| 2002/0071404 A1 * | 6/2002 | Park et al. | 370/331 |
| 2002/0154776 A1 * | 10/2002 | Sowa et al. | 380/247 |
| 2003/0043772 A1 * | 3/2003 | Mathis et al. | 370/338 |
| 2003/0058857 A1 * | 3/2003 | Maher et al. | 370/390 |
| 2003/0161287 A1 * | 8/2003 | Venkitaraman et al. | 370/338 |
| 2004/0058679 A1 | 3/2004 | Dillinger | |
| 2005/0026617 A1 | 2/2005 | Okuyama | |
| 2005/0232236 A1 * | 10/2005 | Allison et al. | 370/352 |
| 2006/0007954 A1 * | 1/2006 | Agrawal et al. | 370/466 |
| 2006/0098576 A1 * | 5/2006 | Brownrigg et al. | 370/238 |
| 2006/0128394 A1 * | 6/2006 | Turina et al. | 455/453 |

(Continued)

OTHER PUBLICATIONS

PCT/US06/06826, PCT Search Report and Written Opinion, mailed Jul. 3, 2007, 9 pages.

(Continued)

*Primary Examiner*—Jean A Gelin
(74) *Attorney, Agent, or Firm*—Indira Saladi; Valerie M. Davis

(57) ABSTRACT

Methods for informing a mobile device of adjacent sites in a RF communication system wherein the RF communication system comprises a first network and a second network are disclosed. A mobile device in the first network of the RF communication system updates a signaling gateway with position information of the mobile device wherein the signaling gateway interfaces between the first network and the second network and receives a list of adjacent sites in the second network from the signaling gateway.

19 Claims, 4 Drawing Sheets

U.S. PATENT DOCUMENTS

2006/0129607 A1\* 6/2006 Sairo et al. ............... 707/200
2006/0239205 A1\* 10/2006 Warren et al. ............. 370/254

OTHER PUBLICATIONS

PCT/US2006/006826, PCT Preliminary Report on Patentability, mailed Oct. 11, 2007, 7 pages.

Australian Patent Office, No. 2006229697, Examiner's First Report [Objection], Oct. 30, 2008, 24 pages.

Canadian Intellectual Property Office, File No. 08909294CA, Office action, Apr. 3, 2009, 3 pages.

USA Office Action for Related U.S. Appl. No. 11/115,438 Dated Aug. 21, 2006.

USA Office Action for Related U.S. Appl. No. 11/115,438 Dated Jan. 25, 2007.

USA Office Action for Related U.S. Appl. No. 11/115,438 Dated 827/2007.

PCT International Search Report for Related U.S. Appl. No. 11/115,438 Dated May 15, 2007.

PCT International Preliminary Report on Patentability for Related U.S. Appl. No. 11/115,438 Dated Nov. 8, 2007.

\* cited by examiner

METHODS FOR INFORMING SUBSCRIBERS OF ADJACENT SITES

RELATED APPLICATIONS

The present application is related to the following U.S. application commonly owned with this application by Motorola, Inc.: Ser. No. 11/115,438, filed Apr. 27, 2005, titled "Methods for Informing Subscribers in a Channelized Network of Adjacent Sites", Newberg, et, al., issued on May 6, 2008 as U.S. Pat. No. 7,369,852.

FIELD OF THE INVENTION

The present invention relates generally to wireless communication systems and in particular to the field of adjacent site updates in wireless communication systems.

BACKGROUND

A wireless communication system generally comprises a number of "mobile devices," where the mobile devices are typically the endpoints of a communication link, and communications infrastructure comprising base stations, where the communications infrastructure is typically stationary and the intermediaries by which a communication link to a mobile device may be established or maintained. As a mobile device moves in a geographic area, the mobile device may handoff from one site to another site in the communications infrastructure, so that the communication link is maintained. It is generally desirable to allow for the rapid establishment of communication links between a mobile device and the communications infrastructure without errors and without inadvertently dropping or losing a communication link.

Where the communications infrastructure comprises of one type of network, e.g. a traditional channelized network, such as a radio network, the ability to establish communication links between the mobile device and the communications infrastructure is generally accommodated by informing the mobile device of adjacent sites so that when the mobile device has the need to hand off from one site to another, the mobile device has knowledge of adjacent sites. Such a solution is not available where the communications infrastructure comprises of two different types of networks, e.g. a channelized network and a packet data network.

If a mobile device requires the need to switch from a site (also generally referred to as a "base station" or a "transmitter") of a first network to a site of a second network, the mobile device has no knowledge of the sites in the second system. For example, when the mobile device moves between areas serviced by a first network that is a channelized network and areas serviced by a second network that is a packet data network, the mobile device needs to be able to hand off from the first network to the second network without affecting the communication taking place by the mobile device. For example, when a police officer moves from inside the police headquarters building served by a first network toward his squad car served by a second network, the police officer should be able to continue his/her conversation using the same communication unit and without having his or her communication delayed or dropped.

Accordingly, there is a need for informing a mobile device in a first network of adjacent sites in a second network.

BRIEF DESCRIPTION OF THE FIGURES

The present invention is illustrated by way of example and not limitation in the accompanying figures, in which like references indicate similar elements, and in which.

Figure 1:
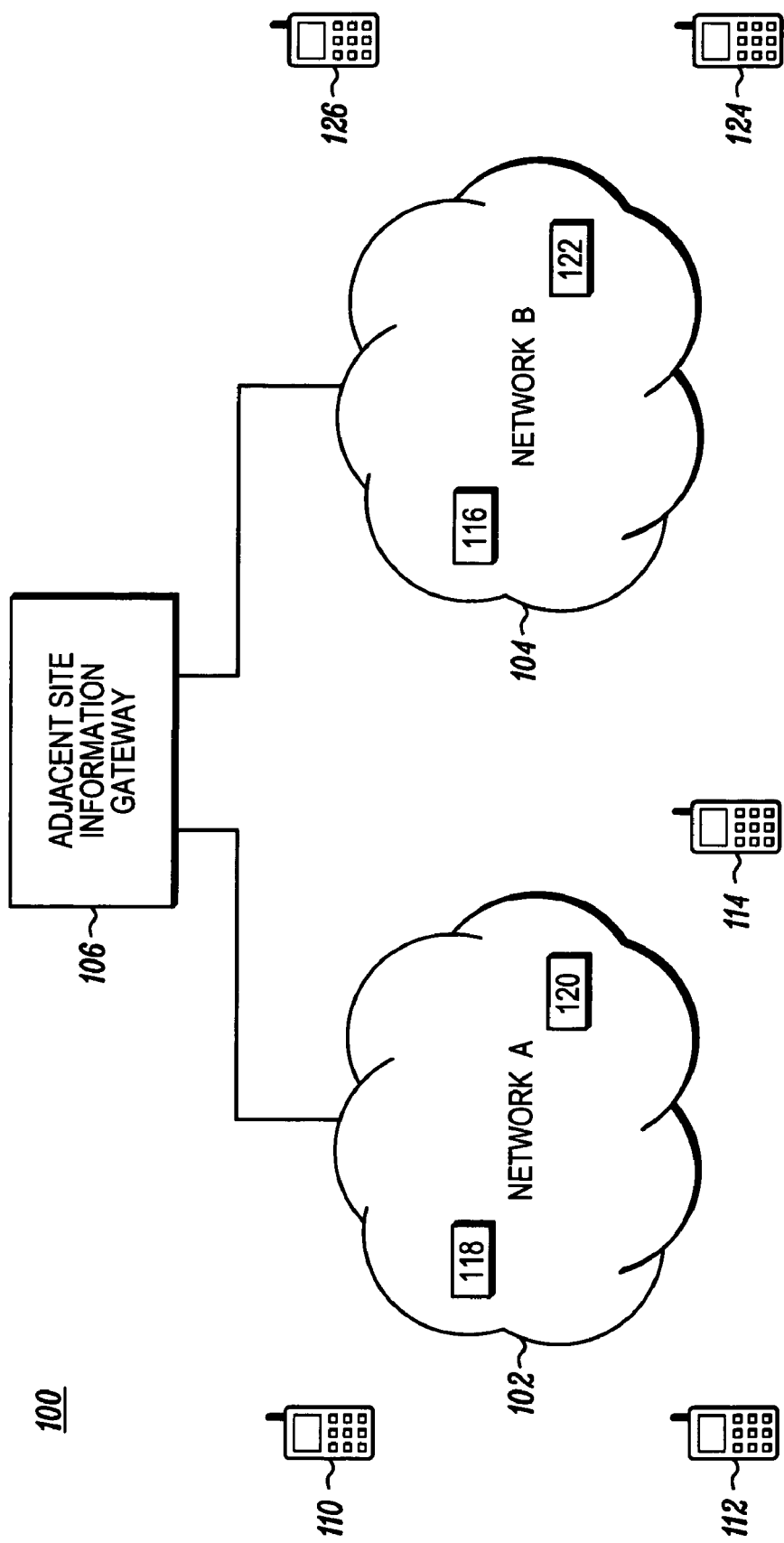
FIG. 1 is an example of a simple block diagram illustrating an RF communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail adjacent site updates in accordance with an embodiment of the present invention, it should be observed that the present invention resides primarily in combinations of method steps and apparatus components related to adjacent site updates. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a radio frequency (RF) communication system 100 according to an embodiment of the present invention illustratively comprises an adjacent site information gateway 106 which interfaces between a first network, namely Network A, 102 and a second network, namely Network B, 104, and mobile devices 110, 112, 114. Network A 102 comprises sites 118, 120 and Network B 104 comprises sites 116, 122. In FIG. 1, each network is illustrated with only two sites for the purpose of ease of illustration. However, it should be understood by those of ordinary skill in the art that both networks may be designed with any number of sites.

As used herein, the term "site" is also generally referred to as a "base station" or a "transmitter." Further, as is known in the art, a site refers to a collection of co-located transmitters having a substantially similar coverage area or antenna pattern. As is further known in the art, a site typically comprises a single signaling channel.

In an exemplary embodiment of the present invention, the adjacent site information gateway 106 is an interface which provides signaling for the two networks. That is, the adjacent site information gateway 106 receives messages from mobile devices from one network and provides information about the other network in response to queries. Further, the adjacent site information gateway 106 may maintain a database for keeping track of the mobile devices in the two networks and have information such as IDs, talkgroup identifiers, and geographic location. Further, the information in the database may include information about sites in the two networks and have information such as site IDs, capacity, and site location. Further yet, a typical adjacent site information gateway 106 includes a main processing unit such as a computer with appropriate control software that controls the operation of the gateway 106.

Network A 102 and Network B 104 are separate networks where the two networks differ in at least one characteristic. The two networks may differ in ownership. For example, Network A 102 may be owned by one governmental entity, and Network B 104 may be owned by another governmental entity. The two systems may differ in whether they are managed or not, where management refers to the level of central control of the network. For example, Network A 102 may be an unmanaged network, such as a wireless local area network (WLAN) and Network B 104 may be a managed network, such as a Trans European Trunked Radio (TETRA) network. The two systems may differ in protocol. For example, Network A 102 may be an Association of Public Safety Communication Officers Project 25 (APCO 25) radio network and Network B 104 may be an Internet Protocol (IP) network. The two systems may differ in the type of switching. For example, Network A 102 may be a packet data network having no switching and Network B 104 may be a circuit switched network. The two systems may differ in channelization. For example, Network A 102 may be a single channel network and Network B 104 may be a channelized network. The two systems may differ in capacity. For example, Network A 102 may support high bitrate traffic and Network B 104 may support only low bitrate traffic. The two systems may differ in Quality of Service guarantees. For example, Network A 102 may support only best effort QoS and Network B 104 may support a guaranteed QoS. The two systems may differ in the ability to support communication with a mobile device that is in motion. For example, Network A 102 may communicate with stationary mobile devices and Network B 104 may communicate with mobile devices traveling at high speeds. In any case, the characteristic that differentiates the two networks is at least one of ownership, management, protocol, switching, channelization, capacity, Quality of Service guarantees, and ability to support communication with a mobile device that is in motion.

The endpoints of communication in the RF communication system 100 are the mobile devices 110, 112, 114. The mobile devices 110, 112, 114 are generally communication devices that may be either sources or recipients of payload and/or control messages routed through the RF communication system 100. As such, the mobile devices 110, 112, 114 may be any suitable type of wireless communications device capable of communicating within the RF communication system 100, for instance, a laptop computer, a personal digital assistant, a voice handset, or any other suitable device as will be appreciated by those of skill in the art. In an exemplary embodiment, the mobile devices 110, 112, 114 are P25 radios equipped with a WLAN modem. The mobile devices may also be connected to a fixed communications infrastructure, if desired.

In operation, the mobile device, e.g. mobile device 114, may roam from a first coverage area serviced by Network A 102 to a second coverage area serviced by Network B 104 while receiving a communication. The communication may be voice, video, or a multi-media communication encompassing both voice and video and may be received from another mobile device or from another communications device either within the RF communication system 100 or without. Thus, the mobile device 114 may be connected to Network A 102 and move into an area serviced by Network B 104. As is known in the art, the two areas may physically overlap and the two networks may serve the same physical area. In an embodiment of the present invention, the mobile devices 110, 112, 114 are informed of the sites, e.g. sites 116, 122, in Network B 104 so that a mobile device in Network A 102 can switch without disruption to Network B 104. Similarly, the mobile devices 124, 126 are informed of the sites, e.g. sites 118, 120, in Network A 102 so that a mobile device in Network B 104 can switch without disruption to Network A 102.

While an embodiment of the present invention has been described in broad terms regardless of the types of networks, an embodiment of the present invention is contemplated to work with many types of networks. For example, both Network A 102 and Network B 104 may be APCO 25 voice radio systems owned by different entities. For example, Network A 102 may be owned by a local police department and Network B 104 may be owned by the federal government. Another example, Network A 102 may be an APCO 25 voice network and Network B 104 may be an APCO 25 data network. Another example, Network A 102 may be an IP system and Network B 104 may be an APCO 25 voice or data network. In yet another example, Network A 102 may be a public cellular network and Network B 104 may be an APCO 25 voice or data network. Regardless of the type of network, as mentioned above, the two networks differ in at least one characteristic.

Further, examples of either Network A 102 or Network B 104 encompass radio frequency (RF) technologies, such as Code Division Multiple Access (CDMA), Time Division Multiple Access (TDMA), Frequency Division Multiple Access (FDMA), Orthogonal Frequency Division Mutiplexing (OFDM), and the like, implemented in any currently available radio network, such as, for example, Global System for Mobile communication (GSM), General Packet Radio Service (GPRS), Universal Mobile Telecommunications Service (UMTS), Trans-European Trunked Radio service (TETRA), APCO Project 25 (as mentioned above), Personal Communication Service (PCS), Advanced Mobile Phone Service (AMPS) and the like. In such examples, the sites 116, 118, 120, 122 may be termed base radios, base stations and/or transmitters. In the alternative, Network A or Network B may encompass other wireless technologies, such as those now known or later to be developed and including, but not limited to, infrared, Bluetooth, electric field, electromagnetic, and electrostatic transmissions.

Further yet, examples of either Network A 102 or Network B 104 may support IP networks, where the IP network may be an 802.11 wireless local area network (WLAN), wherein the mobile devices 110, 112, 114, and the sites 118, 120 are configured to operate in accordance with the ANSI/IEEE (American National Standards Institute/Institute of Electrical and Electronics Engineers) 802.11 wireless LAN standards. Alternatively, the packet data network 104 may adhere to another ANSI/IEEE 802 wireless standard, such as 802.15.1, 802.15.3, 802.15.4, 802.16, 802.20, 802.22, and the like. The mention of ANSI/IEEE 802.11 is not to be construed as a limitation. In such an example, the sites 116, 118, 120, 122 may be termed access points (APs) and/or transmitters.

Practitioners skilled in the art will appreciate that the RF communication system 100 may include various other communication devices not specifically shown in FIG. 1. For example, either network 102, 104 may comprise a link, such as, for example a T1 line or E1 digital carrier system that connects a site, e.g. site 116 to a public switched telephone network (PSTN) via a telephone gateway, a paging network or short message system via a paging gateway, and a facsimile machine or similar device via fax gateway or modem. In addition, either network 102, 104 may be connected via a site, e.g. site 118, to an underlying network that may be implemented, for instance, as a wired network or as a mesh network having fixed or mobile sites.

In any case, the communication between the sites 116, 118, 120, 122 and the mobile devices 110, 112, 114, 124 may comprise multiple RF channels such as pairs of frequency carriers, TDMA time slots, CDMA channels, and the like or may comprise a single RF channel with a single OFDM channel, and the like. Thus, the communications between the sites and the mobile devices takes place on the channel(s).

Figure 2:
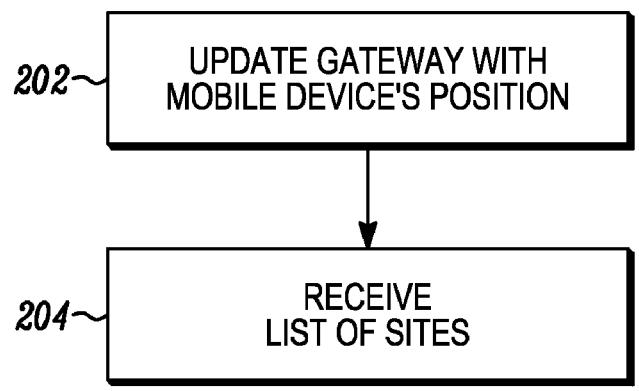
FIG. 2 is a flow chart illustrating a method for a mobile device in a first network to be informed of sites in a second network in accordance with some embodiments of the invention.

Referring to FIG. 2, shown is a flow chart for the process performed by a mobile device, e.g. mobile device 114, that is in Network A 102 to be informed of sites in Network B 104. In an exemplary embodiment, the mobile device is informed of relevant sites in Network B 104 where relevant sites are those that are geographically close to the mobile device. The mobile device updates the adjacent site information gateway 106 with information relating to the mobile device's position (Block 202). In one embodiment, the mobile device sends the adjacent site information gateway 106 geographic coordinates that are obtained from a global positioning satellite (GPS). Such information is sent in a signaling message to the adjacent site information gateway 106. The signaling messages used can be beacon transmissions (also termed "beacons"), routing messages, or other similar protocol related messages. In an exemplary embodiment, the signaling message is sent as a standard IP datagram. As the mobile device moves in Network A 102, the mobile device updates the adjacent site information gateway 106 with its position. In one embodiment, updating the adjacent site information gateway 106 with position information occurs periodically based upon an elapsed time. In another embodiment, updating the adjacent site information gateway 106 with position information occurs whenever the mobile device has moved a fixed distance. For example, the mobile device may update the adjacent site information gateway 106 with its position every 5 miles; the mobile device may update the adjacent site information gateway 106 every time it changes its site; additionally, the mobile device may update the adjacent site information gateway 106 when it intends to handoff from Network A to Network B. In yet another embodiment, updating the adjacent site information gateway 106 with position information occurs when the adjacent site information gateway 106 requests such an update. For example, the adjacent site information gateway 106 may send a signaling message, such as a broadcast message, requesting that all the mobile devices within the network provide the adjacent site information gateway 106 with position information.

Upon receiving the position information of the mobile device, the adjacent site information gateway 106 determines a list of sites in Network B 104 that are near the mobile device and sends the list to the mobile device (Block 204). How the adjacent site information gateway determines the list of sites in Network B 104 that are near the mobile device is described below with reference to FIG. 3. In one embodiment, the mobile device may receive updates to the list of sites that are near the mobile device whenever the mobile device updates the adjacent site information gateway with its position.

Figure 3:
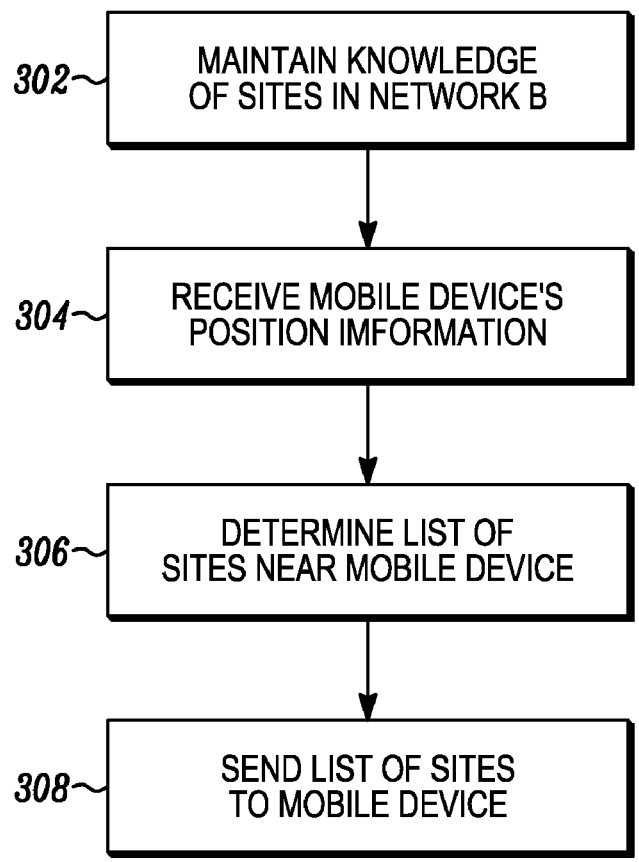
FIG. 3 is a flow chart illustrating a method for an adjacent site information gateway to function as an interface between a first network and a second network in accordance with some embodiments of the invention.

Shown in FIG. 3 is a flow chart for the process performed by the adjacent site information gateway 106 where the adjacent site information gateway 106 functions as an interface between Network A 102 and Network B 104. The adjacent site information gateway 106 maintains knowledge of the sites in Network B 104 (Block 302). Such knowledge includes site parameters where site parameters comprise information relating to RF channels supported by the site, system identification, geographical location of the site, the number of mobile devices supported by the site, the number of mobile devices capable of being supported by the site, the number of communications supported by the site, the bitrate capacity supported by the site, the current bandwidth utilization of the site, the Quality of Service (QoS) guarantees supported by the site, the ability of the site to support communication with a mobile device that is in motion, and the relative preference for this site to be part of a handoff. For example, the adjacent site information gateway 106 may have information of the location of site 116, the capacity as measured by the number of mobile devices supported by the site 116, the RF frequencies of the control and voice channels, etc.

In an exemplary embodiment where Network B 104 is an APCO 25 radio network, the adjacent site information gateway 106 is seen as a Zone Controller by other Zone Controllers in the network 104. The other Zone Controllers are programmed so that they believe that the adjacent site information gateway 106 has a site adjacent to the sites that they manage. By configuring the other Zone Controllers in this manner, the other Zone Controllers update the adjacent site information gateway 106 with any changes in the sites that the other Zone Controllers manage. This insures that the adjacent site information gateway 106 is kept current on the valid sites in Network B 104. In such a fashion, the adjacent site information gateway 106 maintains knowledge of the sites in Network B 104.

The adjacent site information gateway 106 also receives position information about the mobile devices in Network A 102 (Block 304). As mentioned above, the position information may comprise the geographic coordinates of the mobile device and is sent in a signaling message to the adjacent site information gateway 106.

From the knowledge of the sites in Network B 104 and the knowledge of the mobile device's position, the adjacent site information gateway 106 determines a list of sites that are near the mobile device (Block 306). In one embodiment, the adjacent site information gateway determines the list by calculating a distance between the mobile device and each site in Network B 104 where a site is near to the mobile device if the distance is the smallest calculated number. In another embodiment, a site is near to the mobile device if it is closer than a threshold distance.

In any case, the adjacent site information gateway 106 sends a list of sites to the mobile device (Block 308). In one embodiment, the list is sent in a signaling message to the mobile device. In another embodiment, an updated list is sent to the mobile device whenever the mobile device has moved. For example, if the adjacent site information gateway has received new position information from the mobile device, the adjacent site information gateway will send an updated list of sites that are near the mobile device.

Figure 4:
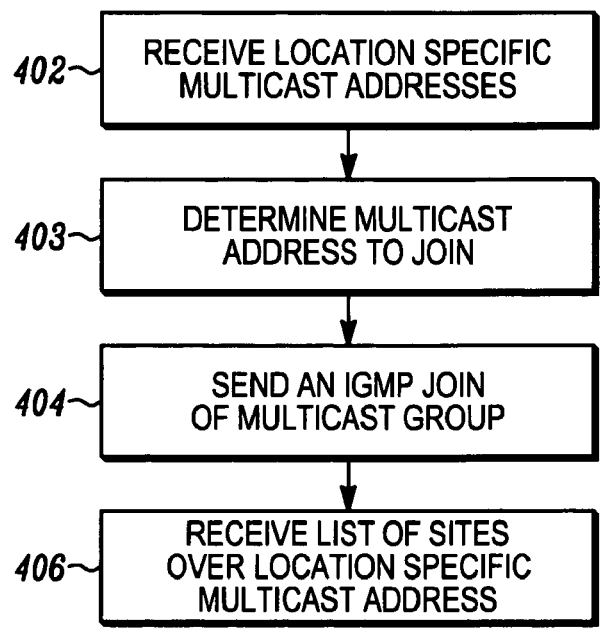
FIG. 4 is a flow chart illustrating a method for a mobile device in a first network to be informed of sites in a second network in accordance with some embodiments of the invention.
Figure 5:
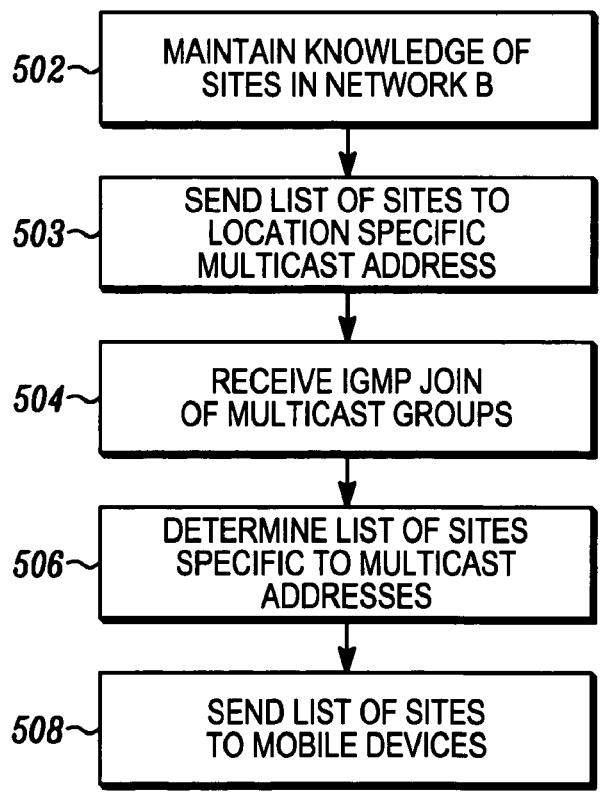
FIG. 5 is a flow chart illustrating a method for an adjacent site information gateway to function as an interface between a first network and a second network in accordance with some embodiments of the invention.

Similar to the flow charts of FIGS. 2 and 3, shown in FIGS. 4 and 5 are flow charts for the activities performed by a mobile device and the adjacent site information gateway 106 when Network A 102 supports multicast traffic where multicast traffic is defined as communications addressed to more than one mobile device. Shown in FIG. 4 is a flow chart for the process performed by a mobile device, e.g. mobile device 114, to be informed of sites in Network B 104. The mobile device receives a list of location specific multicast addresses from the adjacent site information gateway 106 (Block 402). The mobile device determines which multicast address supports its current geographic location (Block 403) and sends out an IGMP join message to become a member of the multicast group associated with the determined multicast address (Block 404).

Referring to FIG. 1, mobile devices 110 and 112 may belong to one multicast group and mobile device (114) may belong to a second multicast group. In such a case, mobile devices 110 and 112 send an IGMP join message referring to the first multicast group and mobile device 114 sends an IGMP join message referring to the second multicast group. In any case, each mobile device receives a list of sites that is specific to the joined multicast address (Block 406). Each mobile device in Network A 102 receives the same list of sites and each mobile device needs to determine the appropriate site from the list that is nearest to the mobile device.

Shown in FIG. 5 is a flow chart for the process performed by the adjacent site information gateway to inform mobile devices in Network A 102 of sites in Network B 104. As mentioned with reference to FIG. 3, the adjacent site information gateway 106 maintains knowledge of the sites in Network B 104 (Block 502). The adjacent site information gateway 106 sends a list of location specific multicast addresses to each mobile device in Network A 102 (Block 503). In response, the mobile device joins at least one of the multicast groups associated with the multicast addresses in the list that the adjacent site information gateway 106 has sent to the mobile device. In an exemplary embodiment, joining a multicast group is performed by the mobile device sending IGMP join messages for the multicast groups (Block 504) to network elements of Network A, e.g. routers of the network. From the knowledge of the sites in Network B 104, the adjacent site information gateway 106 determines a list of sites that are associated with each multicast group (Block 506). In one embodiment, the adjacent site information gateway 106 determines the list of sites in each multicast group by associating each site with a certain coverage area. In any case, the adjacent site information gateway 106 sends a list of sites that are near to the mobile device (Block 508).

Figure 6:
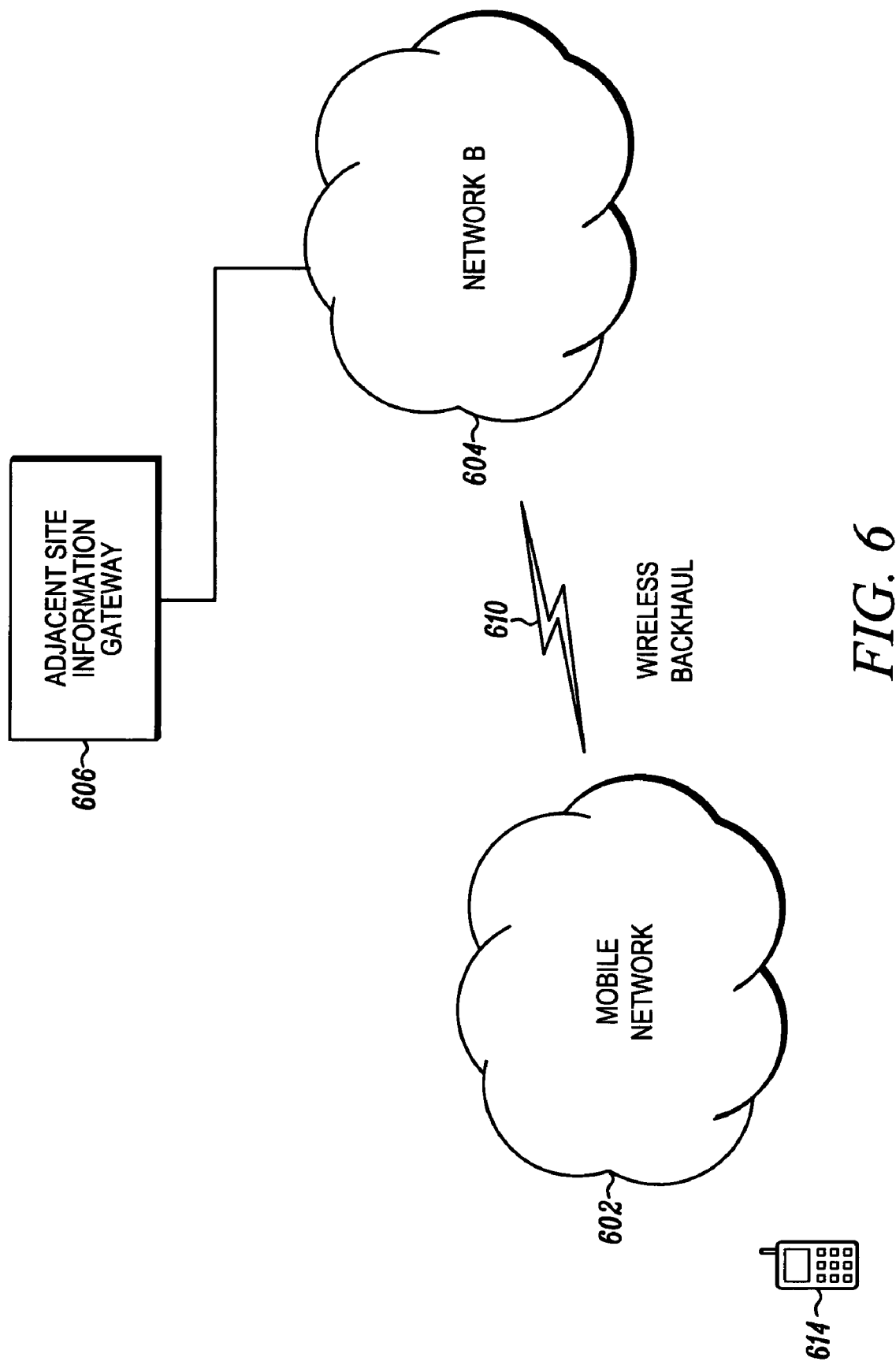
FIG. 6 is an example of a simple block diagram illustrating another RF communication system in accordance with some embodiments of the invention.

Within the scope of an embodiment of the present invention is a method for informing a mobile device of adjacent sites in an adjacent network where the mobile device is in a network that can change physical locations and the adjacent network is typically stationary. Examples of a network that can change physical locations include mobile networks, commonly known as cell on wheels (COW), vehicular networks, and/or vehicular repeaters. For example, referring to FIG. 6, mobile device 614 may be associated with a mobile network 602 and near a Network B 604, wherein the mobile network 602 is connected to Network B 604 by a wireless backhaul. In such a case, Network B 604 may be a network such as described above with reference with Network B 104. The wireless backhaul 610 allows the mobile network 602 to change position; thus, the physical location of mobile network 602 can change in relation to Network B 604. Because the mobile network 602 can change its position, it is advantageous to provide adjacent site information to mobile devices, e.g. mobile device 614, in the mobile network 602. In such a case, an adjacent site information gateway 606 can be used to inform the mobile device 614 of the sites of Network B 604 that are physically near mobile device 614. Thus, when the mobile device 614 moves from the mobile network 602 to Network B 604, it will have knowledge of the adjacent sites in Network B 604. Providing adjacent site information is performed as described with reference to FIGS. 2-5.

It will be appreciated the adjacent site updates described herein may be comprised of one or more conventional processors and unique stored program instructions that control the one or more processors to implement, in conjunction with certain non-processor circuits, some, most, or all of the functions of the adjacent site updates described herein. The non-processor circuits may include, but are not limited to, a radio receiver, a radio transmitter, signal drivers, clock circuits, power source circuits, and user input devices. As such, these functions may be interpreted as steps of a method to perform adjacent site updates. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for informing a mobile device of adjacent sites in a RF communication system wherein the RF communication system comprises a first network and a second network comprising the steps of:

at a mobile device in the first network of the RF communication system:
updating a signaling gateway with position information of the mobile device wherein the signaling gateway interfaces between the first network and the second network; and
receiving a list of adjacent sites in the second network from the signaling gateway, wherein at least a subset of the list is associated with adjacent sites that are closest in geographical proximity to the mobile device.

2. The method of claim 1 further comprising:
requesting a second list of adjacent sites in the second network when the mobile device has moved a significant distance from when the mobile device received the list of adjacent sites, wherein the significant distance is a distance greater than a threshold value; and
receiving the second list of adjacent sites in the second network from the signaling gateway.

3. The method of claim 1 wherein the step of updating occurs at a time wherein the time is at least one of a) when the mobile device changes sites in the first network, b) when the mobile device moves a finite distance, and c) when the mobile device intends to handoff from the first network to the second network.

4. The method of claim 1 wherein the step of updating occurs at intervals.

5. The method of claim 1 wherein the step of updating occurs in response to receiving a request from the signaling gateway to update the signaling gateway with position information.

6. The method of claim 1 wherein the step of determining occurs at a time wherein the time is at least one of a) when the mobile device changes sites in the first network, b) when the mobile device move a finite distance, and c) when the mobile device intends to handoff from the first network to the second network.

7. The method of claim 1 wherein the position information comprises geographic coordinates of the mobile device.

8. The method of claim 1 wherein the first network and second network differ in at least one characteristic wherein the characteristic is taken from the group ownership, management, protocol, switching, channelization, capacity, Quality of Service guarantees, and ability to support communication with a mobile device that is in motion.

9. The method of claim 1 wherein the first network is a mobile network that can change physical locations.

10. The method of claim 1 wherein the second network is a radio network chosen from the list comprising Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), and Advanced Mobile Phone Service (AMPS).

11. A method for informing a mobile device of adjacent sites in a RF communication system wherein the RF communication system comprises a first network and a second network comprising the steps of:
at an adjacent site information gateway, wherein the adjacent site information gateway interfaces between the first network and the second network of the RF communication system:
maintaining knowledge of sites in the second network;
receiving position information from the mobile device, wherein the mobile device is in the first network;
determining a list of adjacent sites in the second network from the maintained knowledge and the received position information, wherein at least a subset of the list is associated with adjacent sites that are closest in geographical proximity to the mobile device; and
sending the determined list to the mobile device.

12. The method of claim 11 wherein the knowledge comprises site parameters of the sites in the second network.

13. The method of claim 12 wherein the site parameters comprise information at least one of RF channels, system identification, geographical location, capacity, current bandwidth utilization, Quality of Service guarantees, the ability of the site to support communication with a mobile device that is in motion, and the relative preference for this site to be part of a handoff.

14. The method of claim 11 wherein the position information comprise geographical coordinates of the mobile device.

15. The method of claim 11 wherein the step of determining further comprises calculating a distance between the mobile device and each site in the maintained knowledge to find a distance that is the smaller than a threshold.

16. The method of claim 11 wherein the step of sending further comprises transmitting a signaling message to the mobile device.

17. The method of claim 11 wherein the step of sending is triggered by movement of the mobile device.

18. A method for informing a mobile device of adjacent sites in a RF communication system wherein the RF communication system comprises a packet data network and a channelized network comprising the steps of:
at a mobile device in the packet data network of the RF communication system:
receiving a list of multicast addresses from a gateway, wherein each multicast address is associated with a geographic area;
determining a multicast address based upon a position of the mobile device;
sending a join message to the packet data network to become a member of a multicast group associated with the determined multicast address wherein the gateway interfaces between the packet data network and the channelized network; and
receiving a list of adjacent sites in the channelized network from the gateway.

19. The method of claim 18 further comprising:
at the gateway of the RF communication system:
maintaining knowledge of sites in the channelized network;
sending a list of multicast addresses to the mobile device, wherein each multicast address is associated with a geographic area;
receiving the join message from the packet data network to become a member of the multicast group;
determining a list of adjacent sites in the channelized network wherein the list is specific to a multicast address from the maintained knowledge; and
sending the determined list to the mobile device.

* * * * *